(No Model.) 4 Sheets—Sheet 1.
J. BERRY.
MACHINE FOR FILING THE TEETH OF ROTARY CUTTERS.
No. 281,960. Patented July 24, 1883.
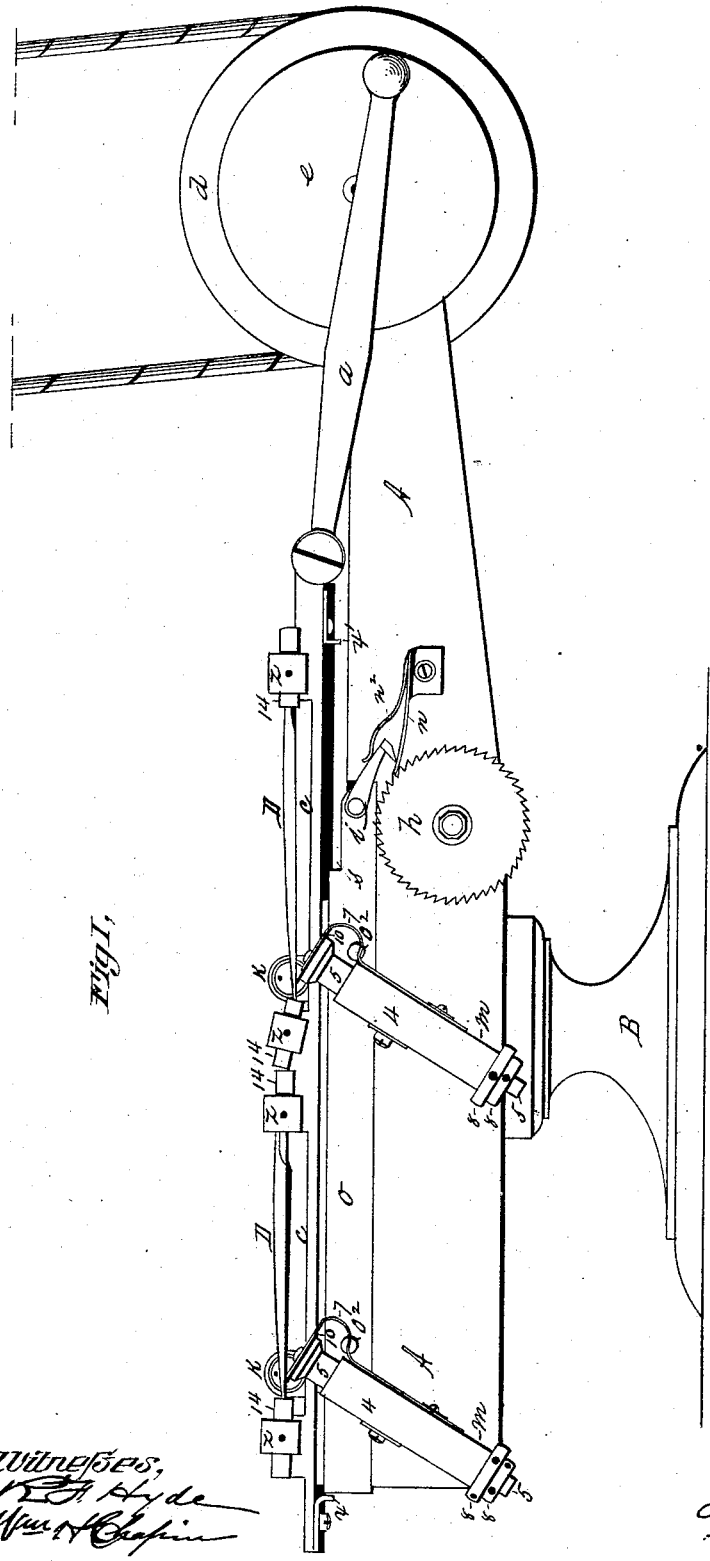
Witnesses,
Inventor,
John Berry
by Henry A. Chapin
atty

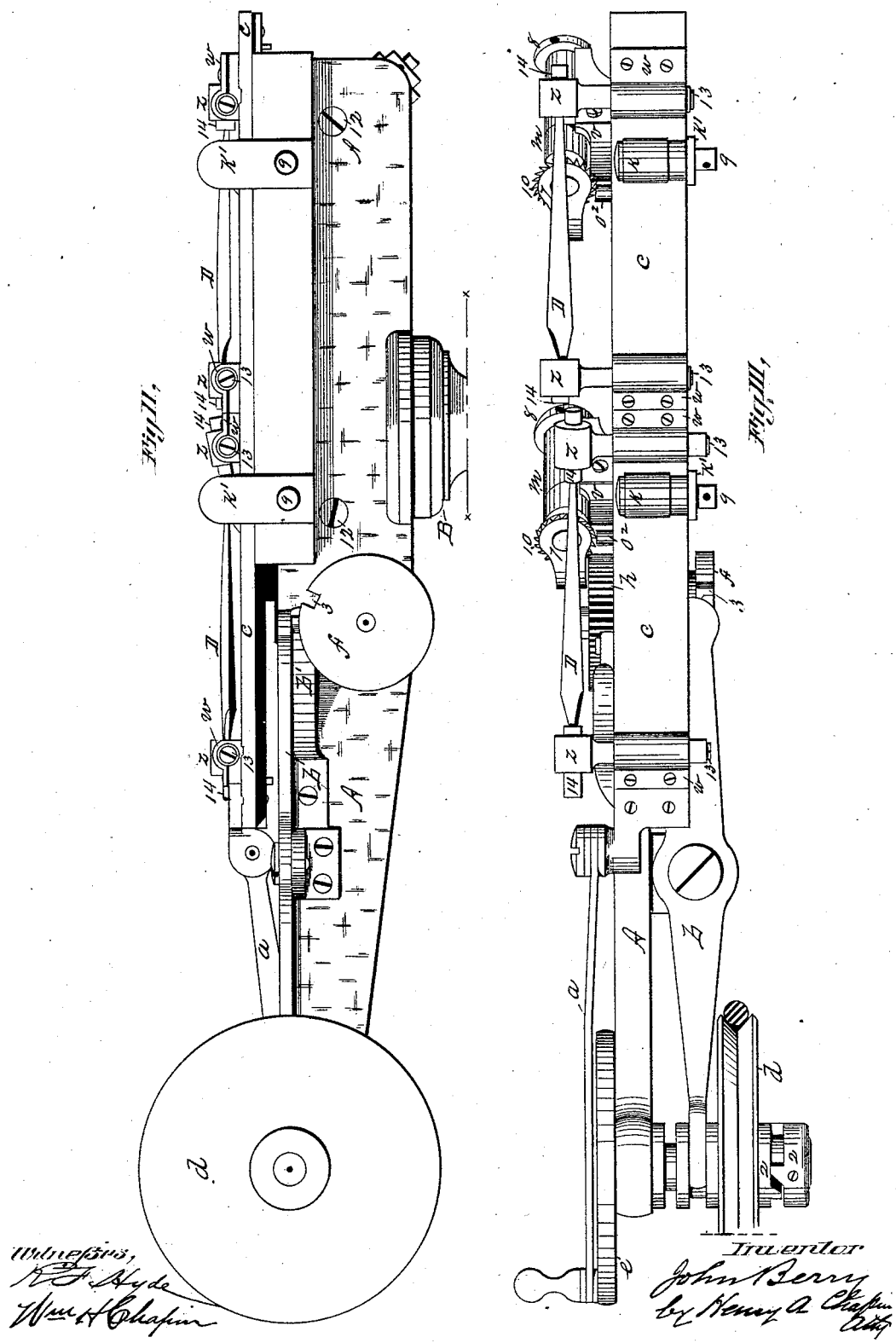

(No Model.) 4 Sheets—Sheet 3.
J. BERRY.
MACHINE FOR FILING THE TEETH OF ROTARY CUTTERS
No. 281,960. Patented July 24, 1883.
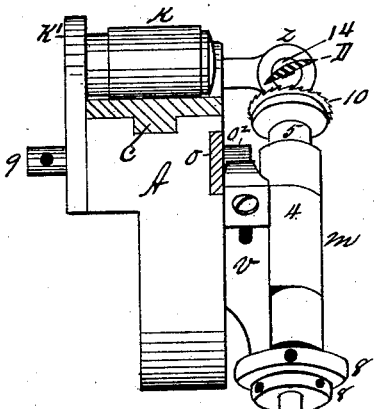
Fig IV;
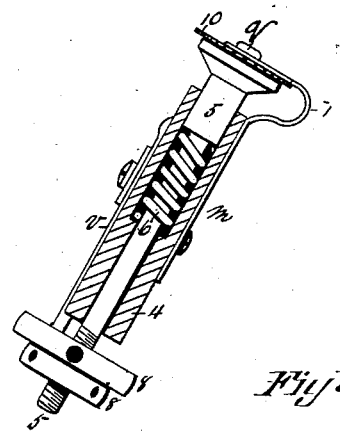
Fig V;
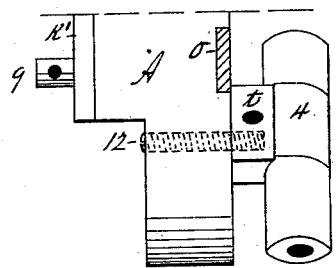
Fig VI,
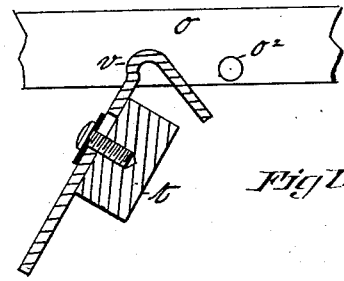
Fig VII,
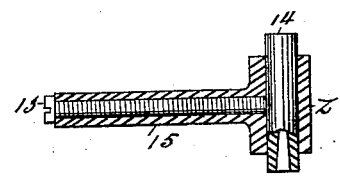
Fig VIII,
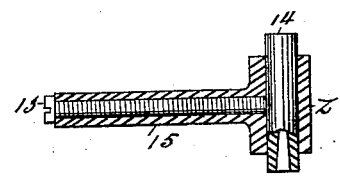
Fig IX,
Witnesses,
R. F. Hyde
Wm H Chapin
Inventor
John Berry
by Henry A Chapin
Atty (No Model.) 4 Sheets—Sheet 4.
J. BERRY.
MACHINE FOR FILING THE TEETH OF ROTARY CUTTERS
No. 281,960. Patented July 24, 1883.
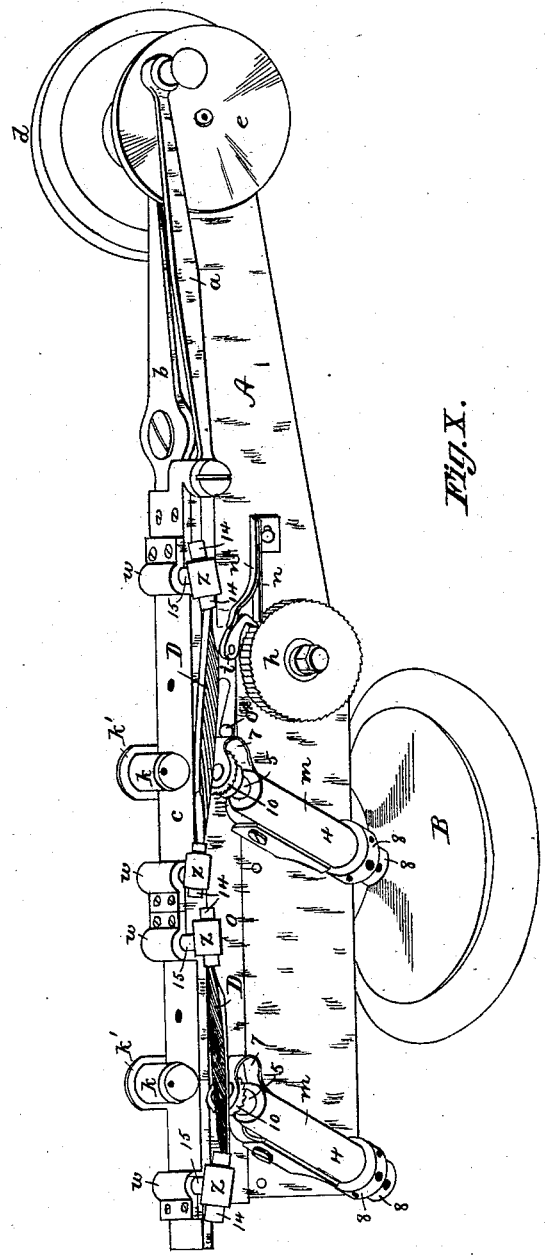
Fig. X.
Witnesses,
Wm H Chapin
R. F. Hyde
Inventor;
John Berry
by Henry A. Chapin
Atty

UNITED STATES PATENT OFFICE.

JOHN BERRY, OF SPRINGFIELD, MASSACHUSETTS, ASSIGNOR TO THE NATIONAL NEEDLE COMPANY, OF SAME PLACE.

MACHINE FOR FILING THE TEETH OF ROTARY CUTTERS.

SPECIFICATION forming part of Letters Patent No. 281,960, dated July 24, 1883.

Application filed September 14, 1882. (No model.)

*To all whom it may concern:*

Be it known that I, JOHN BERRY, a citizen of the United States, residing at Springfield, in the county of Hampden and State of Massachusetts, have invented new and useful Improvements in Machines for Sharpening Cutters, of which the following is a specification.

This invention relates to machines for sharpening rotary cutters, such as milling-cutters used for slotting or grooving sewing-needles; and it consists of a suitable machine-frame supporting one or more cutter-holders upon which cutters may be held and rotated; of a reciprocating carriage to hold and move one or more files against said cutters to file the teeth thereof, and by the same movement to rotate the cutters on their holders to bring another tooth in position to be filed; of devices for giving said cutters an intermittent reciprocating motion toward and from said files, and of means for automatically stopping the machine after the cutter is sharpened, and, furthermore, of cutter and file holders, as hereinafter described, to co-operate with the above-named devices.

In the drawings forming part of this specification, Figure I is a front side elevation of a cutter-sharpening machine embodying my invention. Fig. II is a rear side elevation. Fig. III is a plan view. Fig. IV is an end view, partly in section; and Figs. V, VI, and VII are detail views. Fig. VIII is a view of two sections of a cutter. Fig. IX is a detail view, and Fig. X a perspective view.

In the drawings, A is the frame. B is a supporting-stand. $c$ is a carriage having a reciprocating motion on said frame. $d$ is a driving-pulley. $e$ is a hand-wheel. $a$ is a connecting-rod. 2 2 indicate clutch parts. $b$ is a clutch-lever. $b'$ is a lever-spring. $f$ is a notched wheel. $h$ is a ratchet-wheel. $i$ is a pawl. $n$ is a pawl-guard. $o$ is a sliding bar. $m\ m$ are cutter-holders. $v\ v$ are cutter-holder pushers. $x\ x'$ are arms on said carriage. $z\ z\ z\ z$ are file-supports. $w$ indicates file-support clamps. $k\ k$ are pressure-rolls. 10 10 are cutters. D D are files. 4, 5, 6, 7, and 8 indicate, respectively, the body, piston, coiled spring, cutter-spring, and nuts of the said cutter-holders. $o^2$ are pusher-pins in slide $o$.

The frame A supports upon a shaft passing transversely through one end thereof a hand-wheel, $e$, and a driving-pulley, $d$. The former is fixed on said shaft, and the latter runs freely thereon, and is capable of being moved in the direction of the length of said shaft by a clutch-lever, $b$, which has a forked end engaging in a groove around the hub of said pulley. Clutch parts 2 2 are provided on the outer end of said pulley-hub and on the end of said shaft.

A file-carriage, $c$, is provided with a tongue on its under side, (see Fig. IV,) which fits into a groove in the upper edge of frame A, and one end of said carriage is connected by the rod $a$ with the wheel $e$, and by the revolution of the latter a reciprocating motion is given to said carriage on the frame. To hold said carriage closely against said frame, and yet to allow it to slide easily thereon, two rollers, $k\ k$, are hung on arms which project from supports $k'$ over the carriage, and said supports are secured against the rear side of frame A by the screws $g$. The holes in supports $k'$, through which said screws pass, are slightly larger than the latter, to permit of pressing said rolls closely against the carriage before turning said screws tightly against supports $k'$.

A sliding bar, $o$, is fitted into a groove in the front side of frame A, and is provided with two pins, $o^2$, which project from its surface. The bar $o$ is provided with an offset, $s$, near its rear end, in its upper edge, and has pivoted upon its side a pawl, $i$. Two short arms, $x\ x'$, secured under the carriage $c$, are adapted, one to strike against the forward end of said slide $o$, and the other to strike said offset $s$, and move said bar when said carriage has nearly completed its movement in either direction.

A short shaft passes transversely through frame A, on one end of which is fixed a ratchet-wheel, $h$, and on its opposite end, somewhat removed from the rear side of frame A, is fixed a wheel, $f$, having a notch, 3, in its periphery.

The above-mentioned clutch-lever $b$ is pivoted on the rear side of frame A, one end, as aforesaid, engaging with the hub of pulley $d$, and its opposite end is provided with a down-hanging stud, which is made to bear against the inner face of wheel $f$ by a flat spring, $b'$, which is secured on the side of the frame, and the end of which bears against the rear side of said stud.

A pawl-guard, n, is secured adjustably on the front side of frame A, and an arm, $n^2$, thereon serves as a spring to insure the engagement of said pawl with the teeth on wheel h. Said pawl-guard, the free end of which rests on said wheel, as shown, serves also to hold said wheel against any backward movement as the pawl is moved over its teeth. The pawl-guard is adjustable toward and from the wheel h for the purpose of causing its end to lie more or less over the teeth thereon, and so control the action of pawl i as to make the latter engage with either one or two of said teeth, for the purpose hereinafter stated.

On the front side of the frame A is secured one or more cutter-holders, m, each of which is adapted to support on its upper end a thin circular steel-cutter, 10, with its face in an inclined position, as shown. The cutter-holders consist of a body or case, 4, a piston, 5, a coiled spring, 6, a cutter-spring, 7, and one or more nuts, 8. One side of case 4 is provided with a boss, t, as in Fig. VI, into which a screw, 12, enters from the rear side of frame A, and by which the cutter-holder is secured to the latter. Said holder can be adjusted by means of said screw-fastening to cause the face of the cutter it supports to stand at any desired angle of incline. The case 4 is adapted to have the shank of the piston 5 pass through it, and a main nut and a set-nut, 8 8, are screwed onto the lower end of said piston. A shoulder is formed on said piston, and likewise around the interior of said case, and a coiled spring, 6, on said piston acts between said two shoulders to force the latter upward. Fig. V shows the piston forced downward, as hereinafter described. The upper end of the piston 5 has a head formed on it, as shown, in the center of which is a stud, q.

A cutter-spring, 7, is secured on one side of the holder m, having an upper end about the diameter of said button, which is perforated to let stud q pass through it, and by the form of said spring is made to press against the face of said button when the piston 5 is quite up, and permits the latter to be drawn away from it; but said spring will follow the downward movement of the piston to a moderate degree.

A pusher, v, is secured on the upper side of the boss t of the case 4 by a screw passing through a slot therein, whereby said pusher is allowed to have a sliding motion on said boss. The upper end of said pusher is bent to an incline, and stands in the line of movement of the pin $o^2$ on the slide o, and its lower end is, when the pusher is moved downward, adapted to strike the face of the upper larger nut, 8, and push piston 5 down.

Carriage c supports upon its upper face a series of file-holders, z, each of which has a hollow shank, 15, and a file-tip holder, 14, the latter being of cylindrical form, and fitted into the head of the holder z, as shown. A screw, 13, is fitted to be turned in the shank 15, to be forced against said tip-holder and secure it in any position to which it may be adjusted in the holder z. One end of said tip-holder is provided with a socket of suitable form and depth to receive the tip of a file or the point of its shank. The said holders z are supported on said carriage by a screw-clamp, w, for each one. Said clamps are provided with a cylindrical passage to receive the shank 15, and with a spring-leaf through which suitable screws pass to tighten said clamp upon said shank after the latter and its holder have been turned to the proper adjustment. The aforesaid file-holders project beyond the edge of the carriage c, as shown in the plan view, Fig. III, and a half-round file, D, of the usual tapering form, is secured between two of said holders, and in a position above one of the cutters 10, upon the end of the cutter-holder m. The point of the file and the end of its shank are made to enter cavities in the file-tip holders 14, as aforesaid, and the latter are then turned in the holders z, to bring one edge of said file to bear against the side of a tooth on the said cutter, as it lies on the upper end of the piston 5, and under the spring 7. The flat side of the file is next to the cutter, and the edge thereof which is to operate against the latter is ground to make what is termed a "safe edge," so that the face part only of the file is allowed to cut.

To cause the file to follow the depth of its own cut, and to automatically operate to turn the cutter while it files it, and to have its flat face turned to the required incline (for the latter see Fig. IV) over the cutter-tooth, the holders z and 14 are provided, and by their use the aforesaid conditions are met, as follows, viz: To make the file follow the depth of its own cut, the point thereof is made to take a position slightly higher than its shank by properly turning one or both of its holders z. To automatically operate to turn the cutter while it files it, the safe edge of the file in engagement with the cutter is adjusted to an incline relative to the line of motion of the carriage c, the point of the file, when the edge of the cutter being filed is to rotate toward the carriage, being farther from the carriage, and the degree of incline being a little more than the length of the cutter-tooth, and to so adjust the edge of the file the holders z are moved transversely on the carriage. To adjust the flat face of the file to the lateral incline over the cutter, as shown in Fig. IV, the tip-holders 14 are turned and set in the holders z.

The above-described manner of adjusting the file to an incline to the edge of the carriage applies to the file at the right in Fig. III. That at the left in said figure is adjusted to turn the cutter under it in a direction opposite to that which the file at the right gives to its cutter, and therefore the said safe edge on the file at the left is inclined in a direction opposite to that of the right-hand file, or its point is nearer the edge of the carriage.

By providing two cutter-holders, m, and the carriage c with two files, and so adjusting the latter that each operates upon the opposite side of the cutter-teeth, a cutter is completely filed by being first operated upon by one file and then by the other, an unfiled cutter being supplied to the machine as often as the second side of the former is completed.

The description of cutters which this machine is adapted to operate upon is shown in Figs. III, IV, and V. Fig. VIII illustrates sections of a cutter, one, 16, showing the teeth thereof before filing, and 17 showing their appearance after filing.

The operation of this machine is as follows: By grasping the nut 8 on the lower end of the piston 5, and pulling downward, the face of the button on said piston is drawn sufficiently away from the spring 7 to allow a cutter, 10, to be placed on the stud $q$, and between said spring and button. In this position said cutter is held with a slight friction, and may be rotated on said stud, said piston being released and forced upward by spring 6. While the cutter or cutters are placed on the machine, as just described, the driving-pulley $d$ is running free, the aforesaid stud on the end of the clutch-lever $b$ having been driven into the notch 3 in the wheel $f$ by the spring $b'$, thus drawing the clutch parts 2 2 out of engagement and stopping the machine. One edge of said notch 3 is beveled off, as shown in Fig. III, so that wheel $f$ may rotate and gradually swing lever $b$ and engage said clutch parts to start the machine. The preliminary rotation of wheel $f$ is effected by giving the hand-wheel $e$ a few turns, which operates carriage $c$ and the sliding bar $o$. The latter causes pawl $i$ to engage with and rotate wheel $h$ and wheel $f$, and after a slight rotary movement of the latter, said clutch parts become fully engaged and the machine is in motion, driven by pulley $d$. As the files D pass over the teeth of the cutters, said teeth become properly filed off on their sides. When carriage $c$ has moved from right to left, looking at Fig. I, and said files are at the end of their stroke, the arm $x'$ on said carriage hits the offset $s$ on bar $o$, and slides the latter along, carrying pins $o^2$ on said bar against the upper ends of the pushers $v$, driving the latter downward against the nut 8, and pushing the pistons 5 downward, thus carrying the cutters 10 away from said files, so that the latter do not hit said cutters on their backward stroke, and only act against the latter in a proper manner. As soon as carriage $c$ moves back to the right the arm $x$ thereon strikes the end of bar $o$, sliding it back and carrying pins $o^2$ away from said pushers, and letting the pistons 5 spring up again, bringing said cutters again into position to be operated upon by the files, but this time upon the tooth following the first one, as said cutters were, as above described, rotated one tooth by the passage thereover of the files, and so each successive tooth of the cutter is filed. Ordinarily two passes or strokes of the file are sufficient to properly file the side of each tooth, and to cause the machine to run until said number of strokes shall have been given, the ratchet-wheel $h$ is provided with twice the number of teeth there are on the cutters, and when pawl $i$ is permitted to engage with or pass over only one tooth at each movement thereof, said wheel will have completed one revolution after the cutters have been twice filed and twice rotated, and at this point in the operation of the machine wheel $f$ has been rotated to again bring said notch 3 therein to such a position that said stud on lever $b$ will drop into said notch, and let said lever swing and stop the machine, as above described, when the cutters are changed and the machine is started as before.

If it be desirable to let the file make but one stroke on the side of the cutter-teeth, the pawl-guard $n$ may be moved a little farther from wheel $h$, letting pawl $i$ drop behind two teeth of said wheel instead of one, whereby the latter and wheel $f$ will have completed one revolution by the time the file has filed and rotated the cutter once, and the machine will then stop as before.

It is obvious that one, two, or more files may be carried, as described, by the carriage $c$, and a corresponding number of cutter-holders be arranged opposite them on frame A, as the action of each file and cutter is entirely independent of any others on the machine.

I am aware that it is not new to employ for sharpening saws a vibrating and inclined reciprocating carriage having a file secured thereto beneath the frame, and combined with a rotative clamp for holding a circular saw in a horizontal position beneath the file under the carriage, and means for rotating the saw to the extent of one tooth on the ascending stroke of the reciprocating carriage. My invention differs therefrom, among other particulars, in the means for imparting to the cutter and cutter-holder an intermittent reciprocating motion, in the stop mechanism for automatically arresting the movement of the carriage after the cutter has completed a revolution, and in the yielding cutter-holder and inclined file, jointly, whereby the cutter is revolved by the file bearing against it.

What I claim as my invention is—

1. In a cutter-sharpening machine, a file-carriage adapted to have a reciprocating motion thereon in a right line, and file-supporting devices, substantially as described, a file secured to the supports on said carriage, having one edge thereof set to an incline to the line of the movement of said carriage, a cutter-holder, substantially as described, to support a circular cutter in a rotative position against said inclined edge of said file, and the means, substantially as described, for imparting to said cutter-holder and cutter an intermittent reciprocating motion, all combined and operating substantially as set forth.

2. In a machine for sharpening circular cutters, a frame, a file-carriage adapted to have a reciprocating motion on said frame in a right line, and file-supporting devices, substantially as described, a file secured to said support, with one edge thereof set to an incline to the line of movement of said carriage, and a holder for supporting the circular cutter with a yielding tension against the edge of the file, whereby the cutter is rotated by the file bearing against it, substantially as specified.

3. The combination, in a machine for sharpening circular cutters, of a frame, a file-carriage adapted to have a reciprocating motion thereon in a right line, a file secured to supports on said carriage, having one edge thereof set to an incline to the line of the movement of said carriage, a holder on the frame adapted to support a circular cutter and to permit a rotary motion thereof, and the stop mechanism, substantially as described, for automatically arresting the movement of said carriage after the cutter has completed a revolution, all as set forth.

4. In combination, the carriage $c$, provided with the clamps $w$, the file D, and the file-holders $z$, each having the screw 13 and the tip-holder 14, substantially as set forth.

5. In combination, the carriage $c$, having the arms $x\ x'$ thereon, the bar $o$, provided with pin $o^2$, the pusher $v$, the piston 5, and spring 6, substantially as set forth.

6. The cutter-holder $m$, consisting of the case 4, piston 5, springs 6 and 7, and one or more nuts 8, combined and operating substantially as described.

7. The carriage $c$, having the arms $x\ x'$ thereon, the bar $o$, pawl $i$, the ratchet-wheel $h$, wheel $f$, provided with the notch 3, and lever $b$, combined and operating substantially as set forth.

8. In combination, the carriage $c$, the bar $o$, adapted to be operated by said carriage, the ratchet-wheel $h$, pawl $i$, and the guard $n$, adjustable on frame A, substantially as set forth.

JOHN BERRY.

Witnesses:
 H. A. CHAPIN,
 WM. H. CHAPIN.